(No Model.)

M. E. DOOLITTLE.
CORN PLANTER.

No. 340,992. Patented May 4, 1886.

Witnesses
Geo. W. Young
Henry A. Lamb

Inventor
Merritt E. Doolittle,
By his Attorneys
Jannus and Skinkle

UNITED STATES PATENT OFFICE.

MERRITT E. DOOLITTLE, OF TROY, OHIO, ASSIGNOR TO THE BEEDLE & KELLY COMPANY, OF SAME PLACE.

CORN-PLANTER.

SPECIFICATION forming part of Letters Patent No. 340,992, dated May 4, 1886.

Application filed February 11, 1886. Serial No. 191,590. (No model.)

*To all whom it may concern:*

Be it known that I, MERRITT E. DOOLITTLE, a citizen of the United States, residing at Troy, in the county of Miami and State of Ohio, have invented certain new and useful Improvements in Corn-Planters, of which the following is a specification, reference being had to the accompanying drawings.

My invention relates to corn-planters from which the seed is intermittingly dropped in regular quantities, the feeding mechanism being operated either by hand or by any of the well-known check-rower devices.

It consists in so constructing and arranging the parts that the proper charge of seed for a hill may be accumulated at a point close to the ground one hill in advance of its discharge, so that when discharged it will practically reach the ground in a bunch or clump, and in providing means to enable the driver to watch the operation within the accumulating-chambers.

Figure 2:
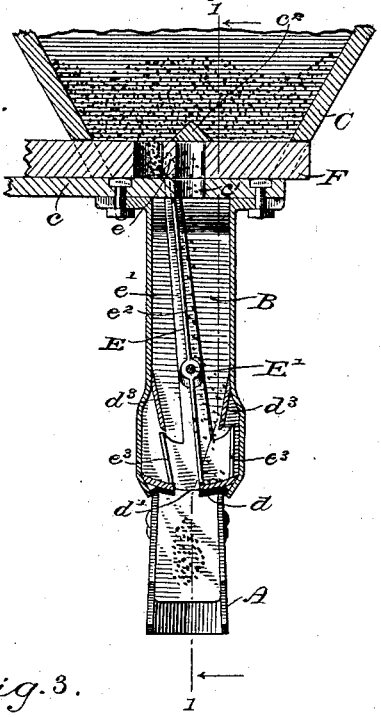
Figure 1:
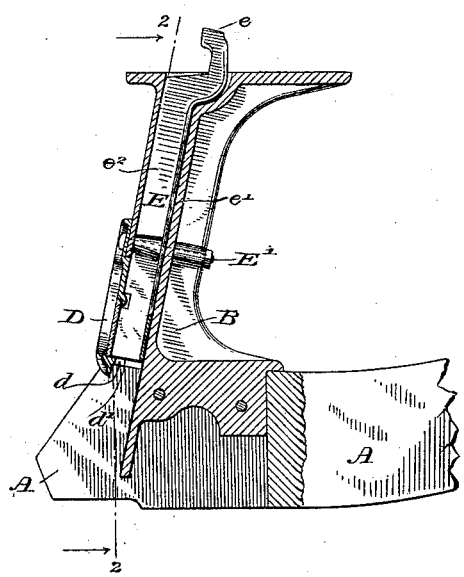
Figure 3:
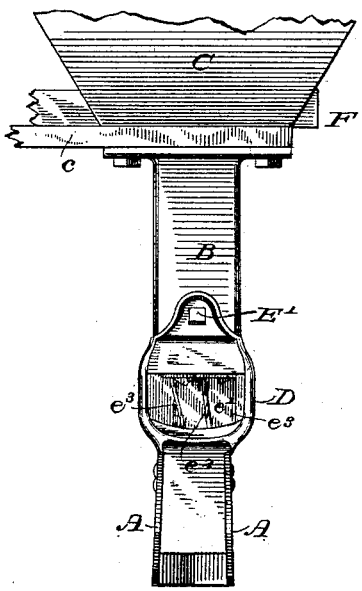
Figures 4, 5:
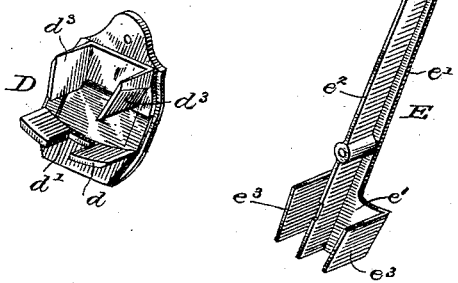

In the accompanying drawings, which illustrate my invention, Figure 1 is a vertical section through the heel-post of a corn-planter runner on the lines 1 1 of Fig. 2. Fig. 2 is a similar section on the line 2 2 of Fig. 1. Fig. 3 is a rear elevation showing particularly the glass window or rear wall of the accumulating-chamber. Fig. 4 is a perspective view of the flint-valve, and Fig. 5 a similar view of the casting or frame which carries the glass and forms the rear wall of the chamber.

The runner-blades A are attached to the heel-post B in any of the usual well-known ways. Within the heel-post is a vertical chamber, open at its top to the feed-hopper C and at its bottom to the space between the rear ends of the runner-blades, and through it the seed is passed on its way to the ground. Near the bottom the rear wall of this chamber is formed by a detachable glazed frame, D, having on its inner surface the several projecting ledges and deflectors which go to make up the accumulating-chambers, hereinafter described. A flirt-valve, E, is pivoted midway of its length in the vertical chamber, and is provided at its top with a hook or projection, $e$, by means of which it is engaged with a reciprocating bar, F, which is moved either by hand or by any suitable check-rower device.

The reciprocating bar, as shown in the drawings, plays across the bottom of the hopper, and constitutes the measuring-valve, which determines the quantity of the grain to be dropped at each reciprocation. The bottom $c$ of the hopper is provided with a central opening, $c'$, above which is a guard or bridge, $c^2$. The bar F fills the space between the bottom of the hopper and the bridge $c^2$, and is provided with two openings or pockets, one of which, as the bar is reciprocated, passes under the bridge and registers with the opening $c'$ in the bottom of the hopper, and discharges its contents through said opening into the chamber, and then, as the bar is moved back, it passes from under the bridge to receive a fresh charge, while its fellow takes its place over the opening $c'$. By this means a charge of grain is projected into the chamber at each reciprocation of the bar F. This measuring-valve is the simplest form now suggesting itself to me, and is only shown for the purpose of illustration, as many of the well-known devices for this purpose might easily be adapted to and used in connection with my invention.

The flirt-valve is composed of a flat web, $e'$, having a longitudinal central rib, $e^2$, of sufficient depth to entirely cross the chamber in which it vibrates, dividing it into two distinct departments. At the bottom of the valve the web is widened at its sides to form wings, upon the edge of each of which is a short projection-rib, $e^3$, of the same depth as the central rib, $e^2$.

The glazed frame D, which constitutes the rear wall of the lower end of the chamber, is made detachable, as shown, and is held in place by the bolt E', (which also serves as a pivot for the flirt-valve,) and has upon its inner face a curved ledge, $d$, the central portion portion of which is cut away to form an opening, $d'$. This ledge extends across the bottom of the chamber, completely closing it, except at the opening $d'$. The frame also carries two projections, $d^3$, which serve as deflectors to the falling seed.

The spaces between the central and side ribs at the bottom of the flirt-valve constitute the chambers or pockets into which the falling grain is accumulated before being discharged into the hills. The lower ends of the ribs lie close to and sweep over the face of the ledge $d$ as the valve is rocked on its pivot E'. When the valve is at either extreme of its throw, one of these chambers presents itself to the opening $d'$ and drops its charge into the hill, while the other lies over the ledge $d$ and receives its charge from the measuring-valve above. The downcoming grain is guided into the receiving-chamber by the central rib, $e'$, and deflector $d^3$, the latter preventing any grain from getting behind the rib $e^2$, which, when the valve is rocked to discharge, sweeps across the ledge and positively moves every kernel to the point of discharge. At a point immediately in the rear of the space through which the bottom of the flirt-valve plays an opening is left in the frame $d$, which at this point forms the rear wall of the chamber, and this opening is closed by a piece of glass secured in the frame in any suitable manner and through which both the receiving and discharging chambers in the flirt valve are always visible to the driver, enabling him to see the operation one hill in advance of the actual discharge of a pocket.

I regard the accumulation of the charge of grain at a point near the ground and in sight of the driver as very advantageous. When the charge is measured at the hopper and allowed to fall from thence to the ground, it will, while falling through the long space, loose its bunched form and straggle out in a perpendicular column, a perceptible interval of time intervening between the first and last grains reaching the ground, and this, owing to the forward movement of the machine, will cause a straggling instead of a bunched hill, such as is deemed desirable.

By my apparatus the grain is gathered at a point so near the ground that when discharged it practically will strike in a bunch.

Having thus described my invention, what I claim as new and useful, and desire to secure by Letters Patent, is—

1. The combination of a vertical conducting-chamber and a flirt-valve pivoted therein, and having a central rib which divides the chamber into two compartments, and two side wings near its bottom, each provided with a rib, which form accumulating-pockets for the seed entirely within the lower end of the conducting-chamber, substantially as hereinbefore set forth.

2. The combination of a conducting-chamber and a detachable frame forming the lower part of the rear wall of the chamber, having on its inner side an apertured curved ledge which constitutes the bottom of the chamber, and two projections which serve as deflectors to the falling grain, substantially as hereinbefore set forth.

3. The combination of a conducting-chamber, the lower part of the rear wall of which is formed by a detachable glazed frame, a flirt-valve pivoted within said chamber, and a bolt which holds the frame in place and serves as a pivot for the valve, substantially as set forth.

4. The combination of a conducting-chamber, a flirt-valve pivoted therein, and having two recesses at its lower extremity, a detachable frame which forms the lower end of the rear wall, and is glazed opposite the recesses in the valve, a curved apertured shelf, and two deflector projections formed with the frame, substantially as hereinbefore set forth.

5. In a corn-planter, the combination of a conducting-chamber and a flirt-valve pivoted therein, and provided at its lower end with pockets or receptacles in which the grain is accumulated near the ground, the rear wall of the chamber being cut away, and the opening glazed opposite the receptacles in the valve, substantially as and for the purposes hereinbefore set forth.

6. The combination of a vertical conducting-chamber having an apertured bottom and a flirt-valve pivoted within said chamber, and provided at its lower end with two pockets or receptacles which terminate at the ledge, and, as the valve is reciprocated, sweep across it, alternately presenting themselves over the aperture, substantially as hereinbefore set forth.

7. The combination of a seed-hopper, a measuring-valve, a conducting-chamber closed at its bottom by an apertured shelf, and a flirt-valve pivoted within the chamber and vibrated simultaneously with the movement of the measuring-valve, the flirt-valve having a central rib, and two pockets at its lower extremity, which, as the valve is vibrated, sweep over the apertured shelf, substantially as and for the purpose hereinbefore set forth.

In testimony whereof I affix my signature in presence of two witnesses.

MERRITT E. DOOLITTLE.

Witnesses:
CHARLES WESTFALL,
GEO. S. LONG.